Nov. 29, 1938.   D. D. DOOLEY   2,138,028
TRANSMISSION
Filed April 6, 1936   4 Sheets-Sheet 1
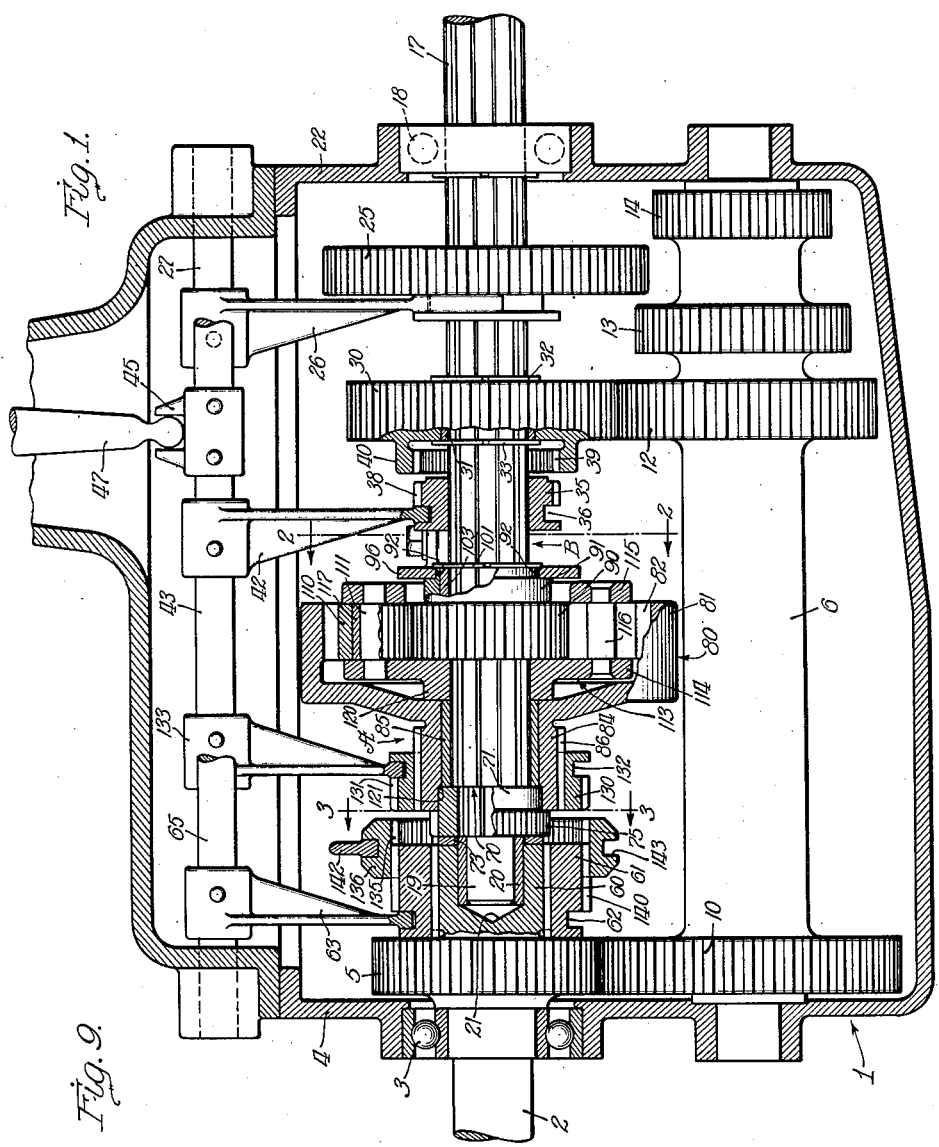
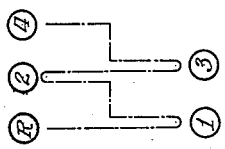
Inventor:
Delmar D. Dooley
By: [signature]
Attys.

Inventor:
Delmar D. Dooley

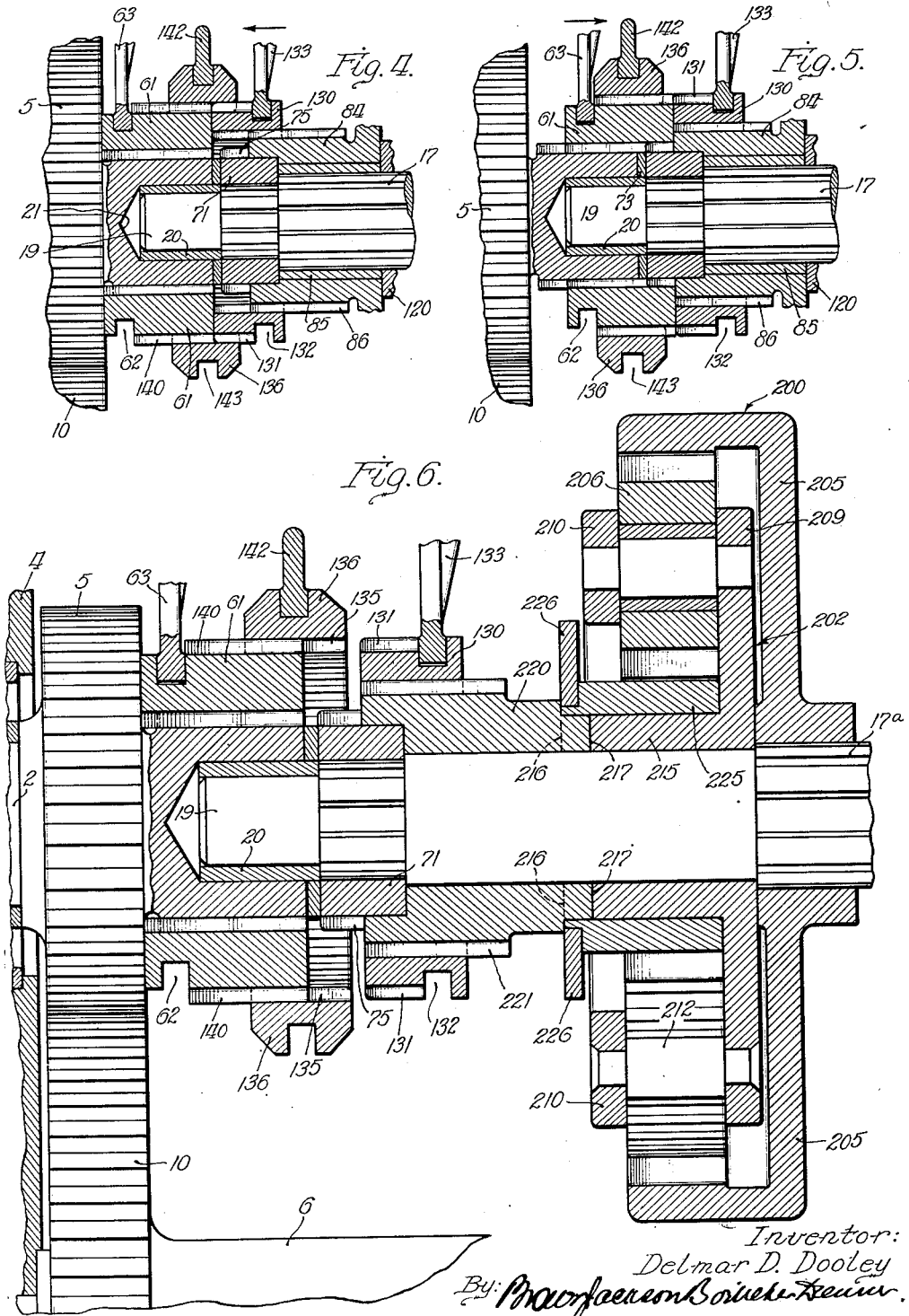

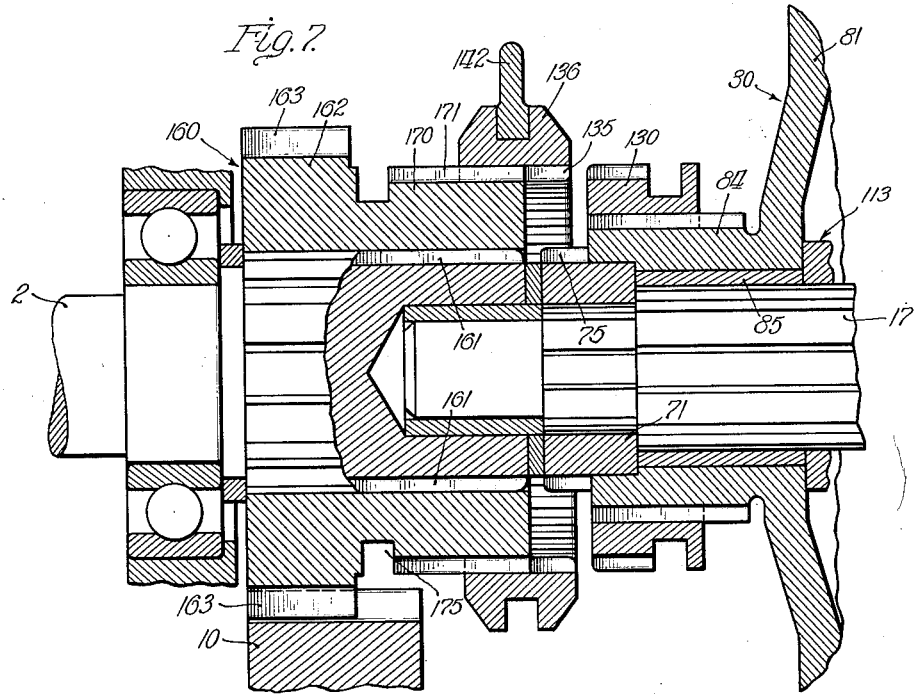
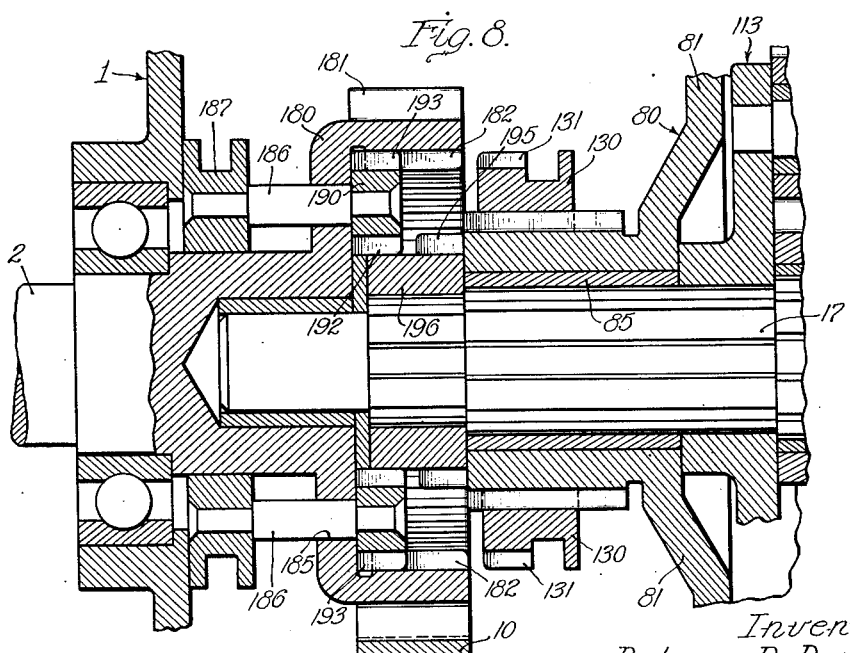

Patented Nov. 29, 1938

2,138,028

UNITED STATES PATENT OFFICE 2,138,028

TRANSMISSION

Delmar D. Dooley, Rock Island, Ill., assignor of one-fourth to Clarence H. Dooley, Rock Island, Ill., one-fourth to H. Keith Dooley, Los Angeles, Calif., and one-fourth to Herbert C. Snow, Auburn, Ind.

Application April 6, 1936, Serial No. 72,873

28 Claims. (Cl. 74—328)

The present invention relates generally to transmissions, gear boxes, and similar devices particularly adapted for the power transmission systems of automotive vehicles and the like, and is principally concerned with an automobile transmission having new and improved features making it possible to optionally select a gear ratio especially adapted for cruising at relatively high speeds and another ratio in which acceleration and hill climbing ability are present at a fair rate of speed but without noise or racing of the motor.

Heretofore, conventional transmissions for automobiles and the like have included three forward speeds in which the available rear axle ratio, that is, the gear reduction between the driving bevel pinion and the ring gear (not shown), for high or direct, was in the nature of a compromise between what would be desirable for cruising at relatively high speeds and what would be desirable in order to secure good acceleration and hill climbing. In the modern automobile this rear axle ratio, that is, the ratio between the propeller shaft speed and the speed of the wheels axles, usually lies in the neighborhood of four to one, this having been found to be acceptable both for acceleration and hill climbing ability and for driving at high speeds.

However, a number of attempts have been made in an effort to provide an automobile transmission which would be capable of establishing the optimum ratio for hill climbing and acceleration and another ratio especially adapted for cruising at high speeds. Transmissions of this character have usually embodied four speeds forward, the third speed generally being a direct drive between the motor shaft and the propeller shaft, and the fourth speed is usually an overdrive in which the speed of the propeller shaft is stepped up beyond the speed of the motor. In such transmissions, however, the conventional rear axle ratio, in the neighborhood of four to one, is usually retained, so that when direct drive is established the automobile is capable of being satisfactorily accelerated and of ascending ordinary hills in high gear at acceptable speed, and in cruising, especially in level country, the fourth or overdrive is then capable of being brought into operation. Sometimes the overdrive is such that it cannot be engaged unless the speed of the automobile has reached some value, generally forty or forty-five miles per hour.

Such overdrives have not proven to be universally satisfactory. After a period of use, the overdrive mechanism becomes noisy, probably because it is required to rotate under load at relatively high speeds, due to the necessity for stepping up the speed of the propeller shaft in order to secure the required car speed with the relatively low conventional rear axle ratio. I conceived, therefore, that it is objectionable to employ a fairly large rear axle reduction and then provide means in the form of some kind of overdrive unit for increasing the speed of the propeller shaft, which is already necessarily rotating at relatively high speed, due to the relatively low rear axle ratio provided in the first place.

Heretofore, in controlling the overdrive or additional speed ratio that was available resort was had to either a separate manually controlled lever or in some instances to some form of automatic control which entailed additional mechanism of more or less costly and complicated construction. In the case of a former, there was a tendency not to use the extra gear ratio available because to engage the same required gear shifting movements different from the ordinary standardized movements of a conventional gear shift lever in practically universal use today. In the latter case where some form of automatic control was adapted, it was found that situations were sometimes encountered in which it would have been desirable to have been able to select the additional speed ratio but that such selection was not available because the automatic or semi-automatic shifting means was not adapted to permit the selection at that particular time.

With the above factors in mind, the present invention has for its principal object the provision of a transmission for automotive and similar vehicles in which there are available two cruising speeds, both efficient and substantially silent in operation, and a simplified control for the same so that either cruising ratio can be engaged by the conventional gear shift lever and in exactly the same conventional sequence of movements. The particular advantage of this arrangement is that the operator of the vehicle need not be educated to and become skilled in the use of some particular gear shift control different from the standard control, but that through the conventional and universally used sequence of movements either cruising speed can be selected. In this connection it is a further object of the present invention to provide two cruising speeds and suitable control mechanism therefor rendering the same particularly adapted to electrically controlled suction operated shifting mechanism which is available at the present time and which is manually controlled by the operator through what is termed a finger tip control, embodying a miniature gear shift lever mounted closely adjacent to the steering wheel, which leaves the driver's compartment entirely free of the conventional centrally mounted gear shift lever.

Another object of the present invention is the provision of a transmission especially constructed to provide two silent cruising speeds, one with the driving and driven shafts arranged for direct rotation and the other in which the drive is transmitted from the driving to the driven shaft through an epicyclic or planetary gear unit which is silent and efficient, and another object of the present invention in this connection is the provision of a transmission embodying these parts in connection with a small gear reduction in the rear axle of the automobile so that the highest speed can be obtained with the driving and driven shafts of the transmission connected together for direct rotation and in which the next lower speed or gear ratio, which is also a cruising ratio, is effected through the epicyclic gear unit arranged as a gear reduction means.

A further object of the present invention is the provision of new and improved mechanism for controlling the connection between the driving and driven shafts and the associated epicyclic gear unit so that the fourth or highest speed can be effected by clutch mechanism moving separately and independently of the clutch mechanism effecting the third speed, whereby these two clutch mechanisms can be controlled by separate gear shift rods or rails with the same conventional sequence of movements of the gear shift lever as is encountered in the standard three speed transmission in wide use today.

These and other objects and advantages of the present invention will be apparent to those skilled in the art after a consideration of the following detailed description of the preferred structure, taken in conjunction with the accompanying drawings forming a part of this specification.

In the drawings:

Figure 1 is a transverse vertical section taken through an automobile transmission embodying the principles of the present invention;

Figures 4 and 5 illustrate two shifted positions of the clutch mechanism controlling the connections between the driving and driven shafts of the transmission;

Figure 6 is a sectional view illustrating a modified form of the present invention in which the epicyclic gear unit is arranged as an overdrive; and Figures 7 and 8 are sectional views, similar to Figures 4 and 5 but illustrating modified forms of the controlling clutch mechanism.

Figure 2:
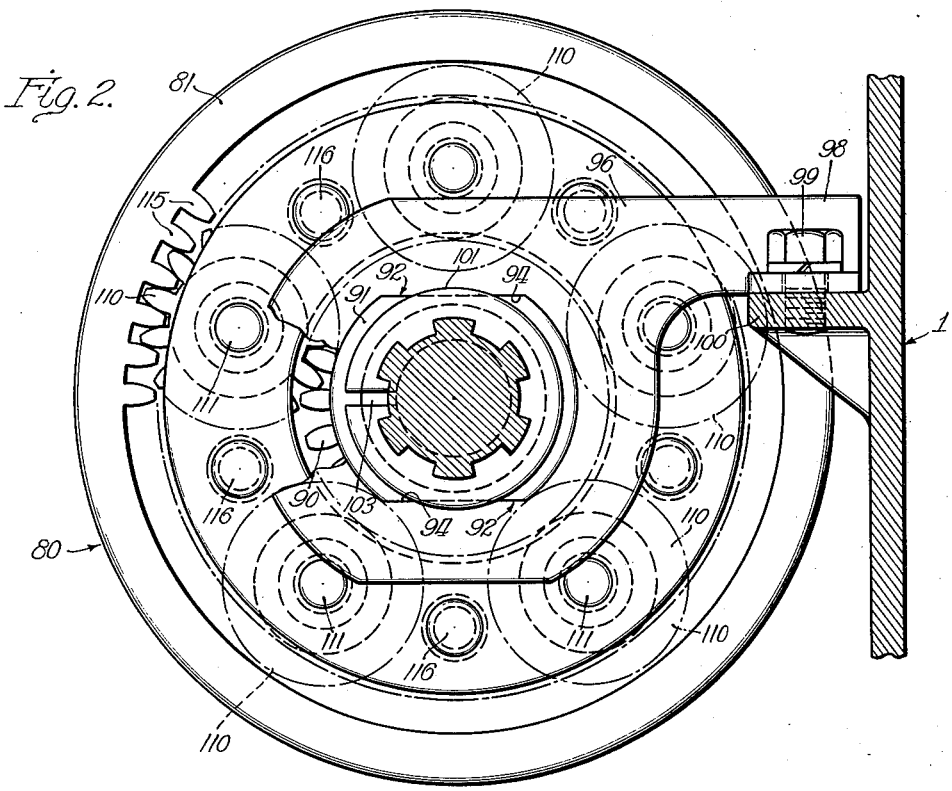
Figure 2 is an enlarged sectional view taken substantially along the line 2—2 of Figure 1 and illustrating in particular the means for holding the sun gear of the epicyclic gear unit against rotation.
Figure 3:
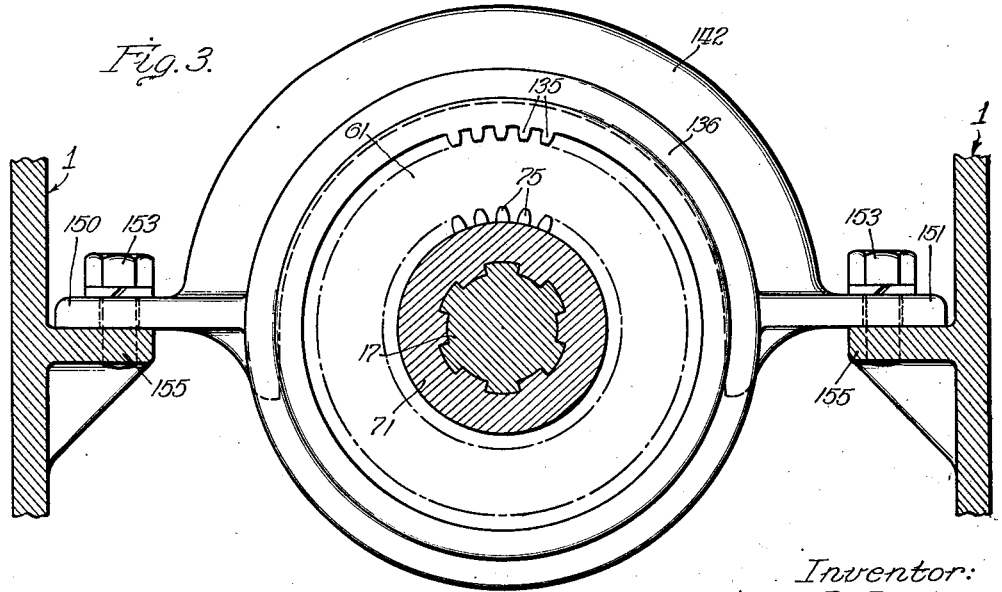
Figure 3 is a sectional view taken along the line 3—3 of Figure 1.

Referring now to the drawings, particularly Figures 1, 2 and 3, the reference numeral 1 indicates the transmission housing in its entirety. A driving shaft 2 is journaled upon suitable bearing means 3 in the forward wall 4 of the transmission and carries a gear member 5 which serves to drive a countershaft 6 journaled for rotation in the lower part of the housing 1. The countershaft 6 includes a driven gear 10 which is in constant mesh with the gear 5, and at its rear end the countershaft 6 is provided with gear sections 12, 13 and 14, the latter being arranged to drive a reverse idler (not shown) as in conventional construction. A driven shaft 17 is journaled for rotation in the transmission housing 1 on suitable bearings 18 and is provided at its forward end with a reduced portion 19 which is piloted on a suitable bushing 20 disposed in a recess 21 in the rear end of the driving shaft 2. The driven shaft is splined and adjacent the rear wall 22 of the transmission housing the driven shaft 17 carries a slidable gear 25 controlled by a shift fork 26 that is carried in any suitable manner on a shift rail 27 slidably mounted in the upper portion of the transmission. The gear 25 is adapted to be moved rearwardly to engage reverse drive and forwardly to mesh with the gear 13 on the countershaft 6 to effect low speed forward.

A second gear 30 is mounted for rotation on the splined driven shaft 17 and is adapted to be in constant mesh with and driven by the gear 12 on the countershaft 6. For this purpose, the constant mesh gear 30 is mounted on suitable bushing means 31 and held in axial position by rings 32 and 33. A clutch member 35 having a shifter groove 36 is slidably mounted on the splines of the driven shaft 17 and carries a set of external clutch teeth 38 which are adapted to mesh with companion internal clutch teeth 39 formed in the hub portion 40 of the constant mesh gear 30. The rearward movement of the clutch member 35 is controlled by a shift fork 42 which is mounted on a shift rail 43. The shift rod or rail 43 also carries a yoke 45, and the above mentioned shift rail 27 also carries a similar yoke (not shown), with which the lower end of a gear shift lever 47 is adapted to engage. When the larger splined gear 25 is in the position shown in Figure 1, the gear shift lever 47 may be actuated so as to shift the clutch member 35 into engagement with the splined hub 40 on the constant mesh gear 30. When this is done, the drive from the driving shaft 2 is transmitted to the driven shaft 17 through the gears 5 and 10, the countershaft 6, and the constant mesh gears 12 and 30.

So far as the particular details so far described are concerned, they are largely conventional, but as mentioned above, one of the principal objects of the present invention is the provision of means providing for two cruising speeds and simplified and conventionally operated means for controlling the selection thereof. The driving shaft 2 is provided with a hub section 60, preferably formed integral therewith, which is splined and upon which a shiftable clutch member 61 is mounted. The clutch member is provided with a shifter groove 62 in which a shift fork 63 is disposed, the shift fork 63 being suitably fixed to a shifter rod or rail 65 mounted in the upper portion of the transmission housing 1 adjacent the shift rails 27 and 43 described above. The forward end of the driven shaft 17 includes a shouldered section 70 against which a collar 71 is disposed. The collar 71 is splined to the shouldered portion of the driven shaft and is thereby fixed to rotate therewith. A thrust bushing 73 is disposed between the forward face of the collar 71 and the rear face of the splined portion of the driven shaft 2, as best shown in Figure 1. The collar 71 also includes a set of exterior splines 75 of the same diameter as the splines on the rear portion of the driving shaft 2, and are adapted to be engaged by the shiftable clutch member 61 when the latter is moved rearwardly, to the right as viewed in Figure 1. For moving the shiftable clutch member 61 rearwardly, the shifter rail 65 is provided with a yoke (not shown) of substantially the same construction as the yoke 45 and adapted to be engaged by the lower end of the conventional gear shift lever 47. When the shiftable clutch member 61 has been moved rearwardly to clutch the splines 75 on the collar 71, the driving and driven shafts 2 and 17 are connected directly together for rotation at a one to one ratio.

According to the principles of the present invention, the driving and driven shafts 2 and 17 are also adapted to be connected together through an epicyclic or planetary gear unit, indicated in its entirety by the reference numeral 80. The unit itself is of more or less conventional construction and embodies a ring gear 81 having a set of internal gear teeth 82 and a central hub portion 84 mounted for rotation on the driven shaft 17, on a bushing 85 or the like. The hub portion 84 of the ring gear member 82 carries a set of external splines 86 for a purpose which will appear later. A sun gear 90 surrounds the driven shaft 17 and, as best shown in Figure 2, provided with a hub section 91 having a flattened portion 92 which is adapted to be engaged by a companion flattened portion 94 formed on a sun gear holding yoke 96. The yoke 96 has an arm portion 98 which is adapted to be fixedly secured, as by a cap screw 99, to a lug 100 formed on or fastened to a wall of the transmission housing 1. Since the yoke 96 has a non-rotatable connection with the sun gear hub 91, the sun gear is held against rotation. A spring ring 101 serves to hold the sun gear in proper axial position. The sun gear is mounted on a bushing 103 which serves as an anti-friction bearing for the sun gear.

A plurality of planet gears 110, preferably but not necessarily five as indicated in Figure 2, are mounted about and mesh with the sun gear 90 and are journaled for rotation on suitable bearing pins 111 supported in a planet gear carrier 113 which comprises two plates 114 and 115 held in spaced apart relation by a plurality of shouldered rivets 116 or the equivalent, as best shown in Figure 1. The planet gears 110 are preferably but not necessarily mounted on anti-friction bushings 117. The planet gear carrier 113 is fixed for rotation with the driven shaft 17 by having the plate section 114 thereof provided with splines engaging the splined portion of the driven shaft 17. Axial displacement of the planet gear carrier 113 in the rear direction is prevented by its engagement with the forward face of the sun gear 90, and displacement of the carrier 114 in a forward direction is prevented by the engagement of the hub portion 120 of the carrier plate member 114 with the hub 84 of the ring gear 80, the forward portion of the latter having a recessed section 121 which engages the rear face of the collar 71 on the forwardmost end of the driven shaft 17.

Clutch mechanism controlling the drive through the epicyclic gear unit 80 is provided, such clutch mechanism being entirely separate and distinct from the clutch 61 controlling the direct connection between the driving shaft 2 and the driven shaft 17. This separate and distinct clutch mechanism comprises a shiftable clutch collar 130 mounted on the splined portion 86 of the ring gear 81 and also provided with a set of external splines 131 and a shifter groove 132, a shift fork 133 carried on the intermediate shift rail 43 having a fork section engaging in the shiftable clutch collar 130 for the purpose of controlling the position thereof. The external splines 131 are adapted to engage companion splines 135 formed on a connecting ring member 136 which is mounted on and in continual mesh with external splines 140 formed on the shiftable clutch member 61. The ring member serves only as a bridging or connecting means and is held against axial displacement in the transmission housing by means of a yoke 142 (Figure 3) which has an arcuate section engaging in an annular groove 143 formed in the ring member 136. The yoke 142 has flattened ends 150 and 151 which are apertured to receive securing cap screws 153 threaded into lugs 155 formed on the walls or secured to the walls of a transmission housing 1. The purpose of the yoke 142 is to provide for the rotation of the connecting ring member 136 with the driving shaft 2 at all times but which prevents any axial movement of the connecting member 136 when the clutch member 61, shiftable rearwardly to engage the collar 71 for direct drive, is moved. The connecting ring member 136 extends in opposite direction an amount sufficient to be engaged by the shiftable clutch member 130 when the latter is moved forwardly from its position shown in Figure 1, such movement of the shiftable clutch member 130 then serving to connect the ring member 81 of the epicyclic gear unit 80 in driving connection with the driving shaft 2.

In operation, when the clutch member 61 is moved rearwardly, a direct drive is established between the driving and driven shafts 2 and 17 by virtue of the engagement of the internal splines of the shiftable clutch member 61 with the external splines on the collar 71 fixed to the driven shaft 17. When the other shiftable clutch member 130 is shifted forwardly, a connection between the driving shaft and the ring member 81 of the epicyclic gear unit is established through the connecting ring member 136, as best described above. According to the preferred form of the present invention the direct connection between the driving and driven shafts 2 and 17 is arranged for fourth or highest forward speed, and to this end the ratio in the rear axle of the automobile is preferably in the nature of three-to-one which permits the attainment of relatively high speed with relatively low motor speed. The next lowest speed, or third speed, is effected by shifting the clutch member 130 forwardly to transmit the drive from the driving shaft 2 to the driven shaft 17 through the epicyclic gear unit 80. Since this unit is inherently silent and particularly since practically all of the driving stresses on the planet gears are balanced, the driven shaft 17 is driven at a somewhat slower speed, but which drive is silent throughout the entire life of the transmission. Both of these speeds, that is fourth or direct and third through the epicyclic gear unit 80, are cruising speeds, in that either may be used interchangeably for long periods of time without any appreciable noise or wear. Second speed is effected by moving the shifter fork 42 rearwardly to carry the clutch member 35 into engagement with the constant mesh gear 30, and first or low speed drive is effected by shifting the spline gear 25 forwardly into mesh with the countershaft gear 13.

It is important to note that the shift fork 133 for the clutch member 130 and the shift fork 42 for the clutch member 35 are both mounted on the same shift rod, while the shift fork 63 for the direct clutch member 61 is mounted upon a third or separate shift rail 65, the first mentioned shift rail 27 carrying the shift fork 26 that controls the position of the splined gear 25. By virtue of the separation of the clutch mechanisms controlling the third and fourth speeds, respectively, the above mentioned arrangement is made possible, and the particular advantage of this arrangement is that the conventional or standard sequence of gear shifting movements of the lever 47 can be utilized throughout the entire range of the transmission, including both third and fourth speeds forward. For example, in the arrangement illustrated in Figure 1, the shift rail 27 is moved rearwardly for reverse drive and forwardly for first or low speed drive; the second gear shift rail 43 is moved rearwardly to effect second speed drive and forwardly to effect third speed drive (which is through the epicyclic gear unit 80 in the arrangement shown in Figures 1 and 4); and rearward movement of the third shift rail 65 effects a direct connection between the driving and driven shafts through the separately shiftable clutch member 61 (Figure 5). Thus, the gear shift lever executes exactly the same sequence of movements as in the conventionel three speed transmission, the path of the upper end of the gear shift lever 47 being indicated in Figure 9. In other words, where another speed is added to the conventional three speed transmission, it is essential to have this additional speed engaged by first a further movement of the gear shift lever to the right and then a forward movement of the gear shift lever, since this selection immediately follows the selection of third speed (or high speed, or direct, in the conventional three speed transmission) which is selected by a rearward movement in line with and in a direction opposite to the direction of movement of the gear shift lever in selecting second speed. Thus, by the present invention, the addition of an extra cruising speed to the transmission does not involve any unconventional movements of the gear shift lever, whether a manual lever or some form of remote control. This conventional sequence of gear shift lever movements would not be possible in any construction in which, for example, the clutch members 61 and 130 were required to move together. According to the present invention, the clutch members 35 and 130 are the parts that are actuated by one shift rail, and it is to be noted that there is sufficient space A (Figure 1) in between the member 130 and the ring gear 81 of the epicyclic gear unit to accommodate the required rearward movement of the other shiftable clutch member 35 in effecting second speed, and also there is sufficient space at B between the clutch member 35 and the sun gear holding yoke 96 to accommodate the required forward movement of the clutch member 35 when the shiftable clutch member 130 is moved forwardly into driving connection with the bridging ring member 136.

Figures 7 and 8 show other forms of clutch mechanism providing for the separate and independent control of the epicyclic gear unit with respect to the control of the direct connection between the driving and driven shafts. Figure 7 illustrates a construction which is quite similar to that shown in Figure 1, and the same parts employed in Figure 7 that are shown in Figure 1 have been indicated by the same reference numerals. In Figure 1 the countershaft driving gear 5 is fixed to or forms an integral part of the shaft 2 and the clutch member 61 is separate therefrom, but in Figure 7 the countershaft driving gear and the shiftable clutch member are combined in one member, indicated in its entirety by the reference numeral 160. The member 160 is provided with a set of internal splines and is mounted for sliding movement on the splines 161 formed on the driving shaft 2. The gear section 162 of the member 160 is provided with conventional gear teeth 163 meshing with the driven gear 10 on the countershaft 6. The clutch section of the member 160 is indicated by the reference numeral 170 and is provided with splines 171 arranged to be in constant mesh with the internal splines 135 formed of the bridging ring member 136, so that the latter member rotates at all times with the driving shaft 2. Between the sections 162 and 170 of the member 160 a shifter groove 175 is provided to receive a shift fork, such as the shift fork 63 shown in Figure 1. In the form of the invention shown in Figure 7, the width of the countershaft gear 10 (or the gear section 162) is sufficient to accommodate the necessary rearward movement of the member 160 in connecting the internal splines 161 thereof with the external splines 75 formed on the collar 71 that is fixed to the forward end of the driven shaft 17. The other shiftable clutch member 130, shown in Figure 7, is controlled in substantially the same manner as indicated in Figure 1.

In Figure 8 another modified form of construction is illustrated but which includes the principles set forth above, namely, that the clutch mechanism effecting a direct connection between the driving and driven shafts is movable separately and independently of the clutch mechanism serving to connect the epicyclic gear unit so that the drive from the driving shaft to the driven shaft is transmitted through the epicyclic gear unit. Referring now to Figure 8, the rear end of the driving shaft 2 is formed with an integral flanged gear section 180 which is provided with a set of external teeth 181 meshing with the countershaft gear 10 and with a set of internal splines 182. A plurality of openings 185 are provided in the web of the flanged gear portion 180, and pins 186 extend therethrough and serve to connect a grooved shifter ring 187 with the shiftable clutch member 190. Preferably, the pins 186 are riveted to the members 187 and 190 after they have been properly assembled, and the member 190 is provided with internal and external splines 192 and 193, the latter splines meshing with the internal splines 182 on the driving shaft and the internal splines 192 being adapted to engage external teeth 195 formed on a collar 196 fixed to the forward end of the driven shaft 17. Thus, whenever the groove shifter ring 187 is moved rearwardly, to the right as viewed in Figure 8, the clutch member 190 is shifted so as to directly connect the driving and driven shafts. The internal teeth 182 on the driving shaft are also adapted to be engaged by the external splines 131 formed on the second shiftable clutch member 130 that is carried on the external splines 85 of the epicyclic ring gear member 80, as described above. As is obvious, the shiftable gear members 130 and 190 are, like the shiftable clutch members described above, movable separately and independently of one another, thus making it possible to secure a standard or conventional sequence of gear shift lever movements in a transmission in which four speeds forward are provided with the two higher speeds both cruising speeds.

In the several modifications shown and described above, a low rear axle ratio has been employed with the fourth forward speed or the highest forward speed being effected by a direct connection between the driving and driven shafts, with the next lower speed being effected through the epicyclic gear unit acting as gear reduction means. While this is in general the most desirable form of transmission, the principles of the present invention by which two cruising speeds are available with a control operable in a standard or conventional sequence can be secured in which the epicyclic gear unit is arranged as an overdrive. Referring now to Figure 6, in which the controlling clutch mechanism is substantially the same as is illustrated in Figure 1, the reference numeral 200 indicates the epicyclic gear means arranged as an overdrive unit. The driven shaft has a bearing portion 201 which is not splined and which receives the planet gear carrier 202 for rotation with respect thereto. The ring gear of the epicyclic gear unit 200 is indicated by the reference numeral 205 and this member is splined to rotate with the driven shaft at all times, just as is the planet gear carrier 113 in the form of the invention shown in Figure 1. The ring gear 205 meshes with a plurality of planet gears 206 mounted for rotation by suitable bearing means on the planet gear carrier 202. The latter member includes two sections 209 and 210, preferably secured together in spaced relation by shouldered rivets 212, the section 209 having an extended hub portion 215 which is provided at its forward face with jaw clutch teeth 216 with which similar teeth 217 carried on a hub member 220 are engaged. The hub member has external splines 221 upon which the shiftable clutch member 130 is mounted for axial movement as in the previously described modifications. The sun gear 225 is mounted on the hub portion 215 of the planet gear carrier and is held against rotation by a yoke member 226 which is of substantially the same construction as has been described above and illustrated in Figure 2. The hub member 220 serves as a part of the planet gear carrier 202, the separable jaw engaged parts 216 and 217 being provided principally to accommodate the assembly of the sun gear 225 and its holding yoke 226. The clutch mechanism associated with the overdrive epicyclic gear unit 200 just described is substantially the same as is illustrated in Figure 1, and hence a further description is unnecessary. It is to be noted, however, that, where in Figure 1 the ring gear 81 is adapted to be connected to be driven by the driving shaft 2, and the gear carrier 113 is connected to rotate with the driven shaft 17, in Figure 6 it is the gear carrier that is adapted to be connected to the driven shaft 2 and it is the ring gear 205 that is rigidly connected to rotate with the driven shaft 17a. By virtue of this arrangement, the unit 200 serves to drive the driven shaft 17a faster than the driving shaft 2. Therefore, in this modification the preferred rear axle ratio is that conventionally employed today, being in the nature of four to one, but the shifting sequence illustrated in Figure 9 is not applicable to the overdrive arrangement of the epicyclic or planetary gear unit when it is connected with shifting mechanism in the manner indicated in Figure 6.

While I have shown and described above the preferred structure in order to illustrate the principles of the present invention it is to be understood that my invention is not to be limited to the specific details shown and described above, but that, in fact, widely different means may be employed in the practice of the broader aspects of my invention.

What I claim, therefore, and desire to secure by Letters Patent is:

1. In a transmission, the combination of a driving shaft, a driven shaft, manually shiftable jaw clutch means movable in one direction for directly connecting said shafts together to establish a silent cruising speed in direct, an epicyclic gear unit adapted to connect said shafts to establish a second silent cruising speed at a different ratio, and manually shiftable jaw clutch means movable relatively to and in the opposite direction from said first clutch means for completing the drive through said epicyclic gear unit.

2. In a transmission, a driving shaft, a driven shaft, clutch means carried on said driving shaft and movable in one direction for directly connecting said shafts together, an epicyclic gear unit also adapted to connect said shafts together and including a ring gear member and a planetary gear carrier member, one of said members being fixed to and rotatable with said driven shaft and the other being rotatable with respect to both of said shafts, and a second clutch means carried on said other member and movable in the other direction for connecting said other member with said driving shaft.

3. In a transmission having four forward speeds, the combination of a driving shaft, a driven shaft, clutch means movable in one direction for directly connecting said shafts together to establish a silent cruising speed in direct, an epicyclic gear unit adapted to connect said shafts to establish a second silent cruising speed at a different ratio, clutch means movable separately and in the opposite direction from said first clutch means for completing the drive through said epicyclic gear unit, gear change means adapted to establish second speed drive at a ratio next lower than said cruising ratios, common control means for said gear change means and the clutch means completing the lower of said cruising ratios, and separate control means for the other of said clutch means.

4. In a transmission having four forward speeds, the combination of a driving shaft, a driven shaft, clutch means movable in one direction for directly connecting said shafts together to establish a silent cruising speed in direct, an epicyclic gear unit adapted to connect said shafts to establish a second silent cruising speed at a different ratio, clutch means movable separately and in the opposite direction from said first clutch means for completing the drive through said epicyclic gear unit, gear change means adapted to establish second speed drive at a ratio next lower than said cruising ratios and including a shiftable part movable with the clutch means effecting the lower of said cruising ratios, common control means for said gear change means and said shiftable part and movable in one direction to complete second speed drive and in the other direction to complete the lower of said cruising ratios, and separate control mechanism for the clutch means effecting the higher cruising speed.

5. In a transmission having two silent cruising speeds, the combination of a driving shaft, a driven shaft, clutch means for directly connecting said shafts to establish a silent cruising speed in direct, a shiftable clutch member for controlling said clutch means and movable in one direction for completing said direct connection, epicyclic gear means also adapted to connect said shafts to establish a second silent cruising speed at a different ratio, and a second shiftable clutch member separate from said first shiftable member for controlling said epicyclic gear means, said second shiftable member being movable independently of said first shiftable member and in the opposite direction in completing a connection between said shafts through said epicyclic gear means.

6. In a transmission, a driving shaft, a driven shaft, clutch means for directly connecting said shafts together, an epicyclic gear unit also adapted to connect said shafts together and including a planetary gear carrier fixed to said driven shaft and a ring gear mounted on said driven shaft and rotatable with respect to both said driving and driven shafts, and a clutch member splined on said ring gear and shiftable axially thereon to connect said ring gear to said driving shaft.

7. In a transmission having four forward speeds, the combination of a driving shaft, a driven shaft, a countershaft, means for driving the countershaft from the driving shaft, speed change gear means connecting said countershaft and driven shaft including a part shiftable in one direction to complete the drive in second speed, an epicyclic gear unit adapted to connect said driving and driven shafts for third speed forward, a second part shiftable in a direction opposite to said one direction for completing the drive through said epicyclic gear unit, a shift rail connected to both of said parts for completing the drive in second and third speeds forward, and clutch means movable independently of said first and second parts for connecting the driving shaft directly to the driven shaft to complete the drive in fourth speed.

8. In a transmission, a driving shaft, a driven shaft, a countershaft, a gear means for driving the countershaft from the driving shaft and having a part with generally axially directed openings, an epicyclic gear unit adapted to connect said driving and driven shafts, clutch means for effecting the drive through said unit, separate clutch means for directly connecting the driving and driven shafts, and control means for said separate clutch means including a shift ring slidably mounted adjacent said gear means and pins disposed in said axially directed openings and operatively connecting said shift ring with said separate clutch means.

9. In a transmission, a driving shaft, a driven shaft, clutch mechanism adapted to establish a direct connection between said shafts, an epicyclic gear unit adapted to connect said shafts together but at a different ratio, said unit including a gear carrier fixed to the driven shaft, a plurality of planet gears mounted on said carrier, a sun gear meshing with said planet gears and fixed against rotation, a ring gear meshing with said planet gears, bearing means supporting said ring gear on the driven shaft, clutch mechanism adapted to optionally connect said ring gear with said driving shaft, and means separate from and disposed generally radially outwardly of said bearing means for controlling said last named clutch mechanism independent of said first-named clutch mechanism.

10. In a transmission, a driving shaft carrying a countershaft driving gear and a splined portion, a driven shaft mounted for rotation relative to the driving shaft in coaxial relation, a collar fixed to the driven shaft adjacent the end of the driving shaft, a slidable clutch collar shiftably carried on the splined portion of said driving shaft and movable into engagement with said collar to connect said driving and driven shafts for rotation together, an epicyclic gear unit mounted on the driven shaft and adapted to connect said driving and driven shafts together, said epicyclic gear unit including a member mounted to rotate with respect to said driven shaft and having exterior splines, and a second shiftable member carried on the splines of said epicyclic gear member and adapted to be shifted independently of and in a direction opposite to the movement of said first shiftable member for connecting said epicyclic gear member with said driving shaft when said first shiftable member is out of engagement with the collar on said driven shaft.

11. In a transmission, a driving shaft having a splined portion, a shiftable clutch member mounted thereon for axial movement and having interior and exterior splines, a driven shaft journaled for rotation in coaxial relation with respect to said driving shaft, a collar fixed to the forward end of said driven shaft and having exterior splines adapted to be engaged by the interior splines of said shiftable clutch member when the latter is shifted rearwardly to connect said driving and driven shafts directly together, an epicyclic gear unit mounted on said driven shaft adjacent its forward end and having a member mounted for rotation with respect to said driven shaft and including a splined portion with exterior splines, a second shiftable clutch member movable independently of said first shiftable clutch member and having interior and exterior splines, a ring member surrounding said clutch members and having interior splines adapted to be maintained in constant engagement with the exterior splines on said first clutch member and adapted to be engaged by the exterior splines on said second clutch member, and stationary means engaging said ring member for maintaining the latter against axial movement in either direction.

12. In a transmission, a driving shaft having a splined portion, a driven shaft journaled for rotation in coaxial relation with respect to said driving shaft, a collar fixed to the end of the driven shaft adjacent the driving shaft and having exterior splines, a countershaft driving gear member mounted for sliding movement on the splined portion of said driving shaft and adapted in one position to engage the exterior splines of said collar for connecting said driving and driven shafts directly together, said shiftable gear member also having exterior splines, a ring member encircling said portion of the gear member and held in constant mesh with said shiftable gear member so as to rotate therewith at all times, an epicyclic gear unit mounted on said driven shaft adjacent the collar fixed thereto and including a member rotatable with respect to said driven shaft and having an exterior splined portion, and a shiftable collar carried on said last named splined portion and having exterior splines adapted to engage the splined portion of said ring member for connecting said driving and driven shafts through said epicyclic gear unit.

13. In a transmission, a driving shaft having a splined portion, a driven shaft mounted for rotation relative to said driving shaft in coaxial relation, an epicyclic gear unit mounted on said driven shaft and including a ring member fixed to said driven shaft, a stationary sun gear, and a planet gear carrier mounted for rotation with respect to said driven shaft and including a splined portion, a collar fixed to said driven shaft and disposed between the splined portion of said driving shaft and the splined portion of said gear carrier, a first clutch member shiftably mounted on the splined portion of said driving shaft and adapted in one position to directly connect the driving and driven shafts, and a second clutch member movable independently of the first clutch member and adapted to connect the splined portion of said gear carrier with said driving shaft to connect said driving and driven shafts through said epicylic gear unit.

14. In a transmission, the combination of a driving shaft, a driven shaft, clutch means for directly connecting said shafts together to establish a silent cruising speed in direct, an epicyclic gear unit adapted to connect said shafts to establish a second silent cruising speed at a different ratio, clutch means for completing the drive through said epicyclic gear unit, gear change means adapted to establish a drive at a ratio next lower than said cruising ratios, common control means for said gear change means and the clutch means completing the lower of said cruising ratios, and separate control means for the other of said clutch means.

15. In a transmission, a driving shaft, a driven shaft mounted for rotation relative to the driving shaft in coaxial relation, a collar fixed to the driven shaft adjacent the end of the driving shaft, a clutch member connected to rotate with said driving shaft and shiftable with respect thereto into and out of engagement with said collar to connect said driving and driven shafts for rotation together, an epicyclic gear unit mounted between and adapted to connect said driving and driven shafts together, said epicyclic gear unit including a member mounted to rotate with respect to said driven shaft, and a second shiftable member adapted to be shifted independently of and in a direction opposite to the movement of said first shiftable member for connecting said driving and driven shafts together when said first shiftable member is out of engagement with the collar on said driven shaft.

16. In a transmission, a driving shaft having a splined portion, a driven shaft journaled for rotation in coaxial relation with respect to said driving shaft, a collar fixed to the end of the driven shaft adjacent the driving shaft and having exterior splines, a countershaft driving gear member mounted for sliding movement on the splined portion of said driving shaft and adapted in one position to engage the exterior splines of said collar for connecting said driving and driven shafts directly together, a gear change unit adapted to connect said driving and driven shafts, and clutch means adapted to connect said unit with said slidably mounted countershaft driving gear.

17. In a transmission, a driving shaft having a splined portion, a driven shaft journaled for rotation in coaxial relation with respect to said driving shaft, a collar fixed to the end of the driven shaft adjacent the driving shaft and having exterior splines, a countershaft driving gear member mounted for sliding movement on the splined portion of said driving shaft and adapted in one position to engage the exterior splines of said collar for connecting said driving and driven shafts directly together, said shiftable gear member also having exterior splines, a ring member encircling said portion of the gear member and held in constant mesh with said shiftable gear member so as to rotate therewith at all times, a gear change unit adapted to connect said driving and driven shafts, and clutch means adapted to connect said unit to said ring member.

18. In a transmission, a driving shaft having a splined portion, a driven shaft mounted for rotation relative to said driving shaft in coaxial relation, a first clutch member shiftably mounted on the splined portion of said driving shaft and adapted in one position to directly connect the driving and driven shafts, a gear change unit mounted about the driven shaft, and a second clutch member movable independently of the first clutch member and adapted to connect the splined portion of said driving shaft to said gear change unit.

19. In a transmission, a driving shaft having a splined portion, a driven shaft mounted for rotation relative to said driving shaft in coaxial relation, a collar fixed to said driven shaft and disposed adjacent the splined portion of said driving shaft, a first clutch member shiftably mounted on the splined portion of said driving shaft and adapted in one position to directly connect the splined portion of the driven shaft and said collar, a gear change unit adapted to connect said driving and driven shafts, and clutch means adapted to connect said unit with said driving shaft.

20. In a transmission, a driving shaft, a driven shaft, a countershaft, gear means for driving the countershaft from the driving shaft and having a part with generally axially directed openings, a gear change unit adapted to connect said driving and driven shafts, a clutch member rotatable with said unit and adapted to be shifted into engagement with said gear means for completing the drive through said unit, separate clutch means for directly connecting the driving and driven shafts, and control means for said separate clutch means including a shift ring slidably mounted adjacent said gear means and pins disposed in said axially directed openings and operatively connecting said shift ring with said separate clutch means.

21. In a transmission, a driving shaft, a driven shaft, a countershaft, gear means for driving the countershaft from the driving shaft and having a part with generally axially directed openings, a gear change unit adapted to connect said driving and driven shafts, a clutch member rotatable with said unit and adapted to be shifted into engagement with said gear means for completing the drive through said unit, a shiftable clutch member mounted to rotate with said gear means and adapted to connect the driving and driven shafts, and control means for said separate clutch means including a shift ring slidably mounted adjacent said gear means and pins disposed in said axially directed openings and operatively connecting said shift ring with said separate clutch means.

22. In a transmission, a pair of axially aligned driving and driven shafts, a spline collar fixed to the forward end of the driven shaft adjacent the rear end of the driving shaft, an epicyclic gear unit including a driving part mounted for rotation on the driven shaft rearwardly of said spline collar, clutch mechanism adapted to connect said driving shaft with said spline collar, and means adapted to connect said driving shaft to said driving part.

23. In a transmission, a pair of axially aligned driving and driven shafts, a spline collar fixed to the forward end of the driven shaft adjacent the rear end of the driving shaft, an epicyclic gear unit including a driving part mounted for rotation on the driven shaft rearwardly of said spline collar, a splined section formed on said driving shaft, splined means connecting said driving part with the splined section on the driving shaft, and shiftable clutch mechanism disposed generally radially inwardly of said splined connecting means for connecting the driving shaft with said spline collar.

24. In a transmission, a pair of axially aligned driving and driven shafts, a spline collar fixed to the forward end of the driven shaft adjacent the rear end of the driving shaft, an epicyclic gear unit including a driving part mounted for rotation on the driven shaft rearwardly of said spline collar, and clutch mechanism adapted to connect said driving shaft optionally with said driving part and with said spline collar.

25. In a transmission, a driving shaft, a driven shaft, a countershaft, gear means for driving the countershaft from the driving shaft and having a part with generally axially directed openings, a gear change unit adapted to connect said driving and driven shafts and including a part connected in driving relation with one of said shafts, means for connecting another part of said unit with the other of said shafts for completing the drive through said unit, clutch means for directly connecting the driving and driven shafts, and control means for said clutch means including a shift ring slidably mounted adjacent said gear means and pins disposed in said axially directed openings and operatively connecting said shift ring with said clutch means.

26. In a transmission, a pair of axially aligned driving and driven shafts, a collar fixed to the forward end of the driven shaft adjacent the rear end of the driving shaft, an epicyclic gear unit including driving and driven members, one mounted for rotation on the driven shaft rearwardly of said collar, clutch mechanism for connecting said driving shaft to said driven shaft through said collar, and clutch means for connecting said driving shaft to said one member.

27. In a transmission, a pair of axially aligned driving and driven shafts, a collar fixed to the forward end of the driven shaft adjacent the rear end of the driving shaft, an epicyclic gear unit including driving and driven members, one mounted for rotation on the driven shaft rearwardly of the collar and the other fixed in driving engagement with said driven shaft, and clutch mechanism for optionally connecting said driving shaft with said one epicyclic gear unit member and with said driven shaft through said collar, said clutch mechanism comprising shiftable means adapted to have driving connection with said driving shaft and including a part movable into engagement with said collar for effecting a direct connection between the driving and driven shafts and another part movable into driving connection with said one epicyclic gear unit member for transmitting the drive from the driving shaft through said epicyclic gear unit to said driven shaft.

28. In a transmission, a pair of axially aligned driving and driven shafts, a collar fixed to the forward end of the driven shaft adjacent the rear end of the driving shaft and having a plurality of generally radially outwardly directed teeth, an epicyclic gear unit including driving and driven members, one mounted for rotation on the driven shaft rearwardly of said collar, and clutch mechanism for optionally connecting said driving shaft to said collar and to said one member and including a splined clutch ring slidably connected with said driving shaft in driving relation and adapted to be shifted into engagement with said collar to directly connect said driving and driven shafts, said clutch mechanism also being adapted to transmit the drive from the driving shaft to said one member through said clutch ring.

DELMAR D. DOOLEY.